(12) United States Patent
Banks et al.

(10) Patent No.: US 7,831,621 B1
(45) Date of Patent: Nov. 9, 2010

(54) SYSTEM AND METHOD FOR SUMMARIZING AND REPORTING IMPACT OF DATABASE STATEMENTS

(75) Inventors: Kevin Banks, Madison, AL (US);
Donovan Kolbly, Austin, TX (US);
Matthew Blackmon, Madison, AL (US)

(73) Assignee: Crossroads Systems, Inc., Austin, TX (US)

( * ) Notice: Subject to any disclaimer, the term of this patent is extended or adjusted under 35 U.S.C. 154(b) by 433 days.

(21) Appl. No.: 11/904,605

(22) Filed: Sep. 27, 2007

(51) Int. Cl.
*G06F 7/00* (2006.01)
*G06F 17/30* (2006.01)
(52) U.S. Cl. .................. 707/790; 707/802; 707/803
(58) Field of Classification Search .............. 707/1–3, 707/9–10, 790, 802, 803; 726/26–30
See application file for complete search history.

(56) References Cited

U.S. PATENT DOCUMENTS

| | | | |
|---|---|---|---|
| 5,261,102 A | 11/1993 | Hoffman | |
| 5,713,018 A | 1/1998 | Chan | |
| 5,721,904 A | 2/1998 | Ito et al. | |
| 5,864,659 A | 1/1999 | Kini | |
| 6,393,428 B1 | 5/2002 | Miller et al. | |
| 6,487,552 B1 | 11/2002 | Lei et al. | |
| 6,606,626 B1 * | 8/2003 | Ponnekanti | 707/8 |
| 7,017,183 B1 | 3/2006 | Frey et al. | |
| 7,058,622 B1 | 6/2006 | Tedesco | |
| 7,092,955 B2 | 8/2006 | Mah et al. | |
| 7,143,080 B2 | 11/2006 | Tedesco | |
| 7,155,737 B1 | 12/2006 | Lim et al. | |
| 7,502,836 B1 | 3/2009 | Menditto et al. | |
| 2003/0023588 A1 | 1/2003 | Shetty | |
| 2003/0105739 A1 | 6/2003 | Essafi et al. | |
| 2003/0135505 A1 | 7/2003 | Hind et al. | |
| 2004/0267674 A1 | 12/2004 | Feng et al. | |

(Continued)

FOREIGN PATENT DOCUMENTS

CN 1352428 6/2002

(Continued)

OTHER PUBLICATIONS

Canahuate et al., "Update Conscious Bitmap Indices", Scientific and Statistical Database Management, 2007. SSBDM '07. 19th International Conference, Jul. 2007. p. 1-10, download: http://ieeexplore.ieee.org/stamp/stamp.jsp?isnumber=4274938&arnumber=4274960&punumber=4274937&tag=1.*

(Continued)

*Primary Examiner*—John E Breene
*Assistant Examiner*—Hares Jami
(74) *Attorney, Agent, or Firm*—Sprinkle IP Law Group

(57) ABSTRACT

Embodiments of the present invention provide a system and method for summarizing and reporting the impact of database statements at a database appliance. The database appliance, according to one embodiment, can receive a database request and determine a set of information related to the request. Embodiments disclosed herein take in as input the database statement text and output multiple impact vectors, each containing both the name of an affected entity and a 32-bit "impact bitmap" for that entity. This concise and unambiguous output format can be computed using fast AND, OR, XOR, and NOT operations, allowing for highly efficient evaluation of database statements against user defined policies and finer policy granularity.

18 Claims, 8 Drawing Sheets

U.S. PATENT DOCUMENTS

| | | | |
|---|---|---|---|
| 2005/0050046 A1 | 3/2005 | Puz et al. | |
| 2005/0060293 A1* | 3/2005 | Day et al. | 707/3 |
| 2005/0188220 A1 | 8/2005 | Nilsson et al. | |
| 2005/0210011 A1* | 9/2005 | Sauermann et al. | 707/3 |
| 2005/0278362 A1* | 12/2005 | Maren et al. | 707/100 |
| 2006/0004828 A1* | 1/2006 | Rajamani et al. | 707/102 |
| 2006/0089932 A1 | 4/2006 | Buehler et al. | |
| 2006/0117014 A1 | 6/2006 | Qi | |
| 2006/0184530 A1 | 8/2006 | Song et al. | |
| 2006/0190455 A1 | 8/2006 | Braddy et al. | |
| 2006/0212524 A1 | 9/2006 | Wu et al. | |
| 2006/0248085 A1 | 11/2006 | Sack et al. | |
| 2006/0262976 A1 | 11/2006 | Hart et al. | |
| 2006/0277184 A1 | 12/2006 | Faitelson et al. | |
| 2007/0094266 A1* | 4/2007 | Parikh et al. | 707/10 |
| 2007/0276835 A1* | 11/2007 | Murthy | 707/9 |

FOREIGN PATENT DOCUMENTS

| | | |
|---|---|---|
| JP | 2002163260 A | 6/2002 |
| WO | WO 03/040923 A1 | 5/2003 |
| WO | WO 2004/042621 | 5/2004 |

OTHER PUBLICATIONS

Office Action issued in U.S. Appl. No. 11/589,333 mailed Aug. 26, 2008, 21 pgs.

Karjoth, Gunter, "Access Control with IBM Tivoli Access Manager," 2003, ACM Transactions on Information and System Security, vol. 6, No. 2, pp. 232-257.

Sloman et al., "Security and Management Policy Specification," 2002, IEEE Network, pp. 10-19.

Office Action issued in U.S. Appl. No. 11/589,333 mailed Feb. 2, 2009, 21 pgs.

Office Action issued in U.S. Appl. No. 11/796,223, mailed May 11, 2009, 11 pgs.

Office Action issued in U.S. Appl. No. 11/589,333 mailed Sep. 30, 2009, 21 pgs.

Pearlman et al., "A Community Authorization Service for Group Collaboration," IEEE, 2002, 10 pgs.

Wohrer, et al., "Virtualization of Heterogeneous Data Sources for Grid Information Systems," CiteSeerX, 2004, 10 pgs.

Czajkowski et al. "Grid Information Services for Distributed Resource Sharing," IEEE, 2001, 14 pgs.

Office Action issued in U.S. Appl. No. 11/796,223, mailed Dec. 10, 2009, 14 pgs.

Office Action issued in U.S. Appl. No. 11/589,333, mailed Mar. 5, 2010, 21 pgs.

Office Action issued in U.S. Appl. No. 11/796,223, mailed Jul. 13, 2010, 17 pgs.

Spinellis, Diomidis, "The Design and Implementation of a Legal Text Database," Filothei, Greece, Sep. 1994, pp. 339-348.

* cited by examiner

| GRANT ALL TO Scott (TSQL) | | | | | | | | | | | | | |
|---|---|---|---|---|---|---|---|---|---|---|---|---|---|
| Impact Bit Groups | MODE_DML_ | | | | MODE_DDL_ | | | | MODE_ACL_ | | | | Legacy Bits |
| Impact Bits | A | I | U | D | A | I | U | D | A | I | U | D | E   ... |
| USER "Scott" | | | | | | | | | | ✓ | | | |

| REVOKE ALL FROM Scott (TSQL) | | | | | | | | | | | | | |
|---|---|---|---|---|---|---|---|---|---|---|---|---|---|
| Impact Bit Groups | MODE_DML_ | | | | MODE_DDL_ | | | | MODE_ACL_ | | | | Legacy Bits |
| Impact Bits | A | I | U | D | A | I | U | D | A | I | U | D | E   ... |
| USER "Scott" | | | | | | | | | | | | ✓ | |

| DENY ALL FROM Scott (TSQL) | | | | | | | | | | | | | |
|---|---|---|---|---|---|---|---|---|---|---|---|---|---|
| Impact Bit Groups | MODE_DML_ | | | | MODE_DDL_ | | | | MODE_ACL_ | | | | Legacy Bits |
| Impact Bits | A | I | U | D | A | I | U | D | A | I | U | D | E   ... |
| USER "Scott" | | | | | | | | | | | | ✓ | |

| GRANT SELECT TO Scott (TSQL) | | | | | | | | | | | | | |
|---|---|---|---|---|---|---|---|---|---|---|---|---|---|
| Impact Bit Groups | MODE_DML_ | | | | MODE_DDL_ | | | | MODE_ACL_ | | | | Legacy Bits |
| Impact Bits | A | I | U | D | A | I | U | D | A | I | U | D | E   ... |
| USER "Scott" | | | | | | | | | | ✓ | | | |

| GRANT ALTER TO Scott (TSQL) | | | | | | | | | | | | | |
|---|---|---|---|---|---|---|---|---|---|---|---|---|---|
| Impact Bit Groups | MODE_DML_ | | | | MODE_DDL_ | | | | MODE_ACL_ | | | | Legacy Bits |
| Impact Bits | A | I | U | D | A | I | U | D | A | I | U | D | E   ... |
| USER "Scott" | | | | | | | | | | ✓ | | | |

| GRANT ALTER ON Dept TO Scott (TSQL) | | | | | | | | | | | | | |
|---|---|---|---|---|---|---|---|---|---|---|---|---|---|
| Impact Bit Groups | MODE_DML_ | | | | MODE_DDL_ | | | | MODE_ACL_ | | | | Legacy Bits |
| Impact Bits | A | I | U | D | A | I | U | D | A | I | U | D | E   ... |
| USER "Scott" | | | | | | | | | | ✓ | | | |

FIGURE 7

| CREATE ASYMMETRIC KEY <keyname>... (TSQL) | | | | | | | | | | | | | |
|---|---|---|---|---|---|---|---|---|---|---|---|---|---|
| Impact Bit Groups | MODE_DML_ | | | | MODE_DDL_ | | | | MODE_ACL_ | | | | Legacy Bits |
| Impact Bits | A | I | U | D | A | I | U | D | A | I | U | D | E ... |
| DB "<name>" | | | | | | ✓ | | | | | | | |

| ALTER ASYMMETRIC KEY <keyname>... (TSQL) | | | | | | | | | | | | | |
|---|---|---|---|---|---|---|---|---|---|---|---|---|---|
| Impact Bit Groups | MODE_DML_ | | | | MODE_DDL_ | | | | MODE_ACL_ | | | | Legacy Bits |
| Impact Bits | A | I | U | D | A | I | U | D | A | I | U | D | E ... |
| DB "<name>" | | | | | | | ✓ | | | | | | |

| DROP ASYMMETRIC KEY <keyname>... (TSQL) | | | | | | | | | | | | | |
|---|---|---|---|---|---|---|---|---|---|---|---|---|---|
| Impact Bit Groups | MODE_DML_ | | | | MODE_DDL_ | | | | MODE_ACL_ | | | | Legacy Bits |
| Impact Bits | A | I | U | D | A | I | U | D | A | I | U | D | E ... |
| DB "<name>" | | | | | | | | ✓ | | | | | |

FIGURE 8

| CREATE INDEX <index_name> ON <table>(<columns>) | | | | | | | | | | | | | |
|---|---|---|---|---|---|---|---|---|---|---|---|---|---|
| Impact Bit Groups | MODE_DML_ | | | | MODE_DDL_ | | | | MODE_ACL_ | | | | Legacy Bits |
| Impact Bits | W | I | U | D | A | I | U | D | A | I | U | D | E ... |
| TBL "<table>" | | | | | | | ✓ | | | | | | |
| COL "<column>" | ✓ | | | | | | | | | | | | |

FIGURE 9

SYSTEM AND METHOD FOR SUMMARIZING AND REPORTING IMPACT OF DATABASE STATEMENTS

CROSS-REFERENCE TO RELATED APPLICATIONS

This application relates to U.S. patent application Ser. No. 11/589,333, filed Oct. 30, 2006, entitled "SYSTEM AND METHOD FOR DEFINING AND IMPLEMENTING POLICIES IN A DATABASE SYSTEM," which claims priority from U.S. Provisional Patent Application No. 60/731,800, entitled "SYSTEM AND METHOD FOR DEFINING AND IMPLEMENTING POLICIES IN A DATABASE SYSTEM," filed Oct. 31, 2005, and U.S. Provisional Patent Application No. 60/795,466, entitled "METHOD FOR OPTIMIZING DATABASE POLICY ENFORCEMENT ON A SIMD-BASED MICROPROCESSOR SYSTEM," filed Apr. 27, 2006, all of which are fully incorporated by reference herein.

TECHNICAL FIELD

This disclosure relates generally to database systems and more particularly to electronic database security. Even more particularly, embodiments disclosed herein relate to a system and method for analyzing, summarizing, and reporting the impact of database statements, useful for highly efficient evaluation of database statements against security policies.

BACKGROUND

Early database systems utilized large centralized computers to store data and terminal devices physically connected to the centralized computer to provide user access to the data. In these early systems, the database management system had all the knowledge necessary to place constraints on data access. The entities defined in the database management system (i.e., users, tables, columns, rows, functions) could be used by the database management system to restrict or allow access to data and operations by users.

More recently, most database systems have been implemented in networked environments in which users can access a database from a variety of heterogeneous clients. The security model used by many current database systems, however, extends from the security model developed in early database systems. In such systems, describing the constraints on access and usage of data to meet security requirements is done in terms of entities internal to the database itself and these descriptions are maintained/interpreted by the database itself. In other words, security policies to perform operations on data in the database are defined based on entities defined internally in the database itself.

Current database security schemes are insufficient because of the complexity inherent in a networked environment, which grows non-linearly with the number of components in the networked environment. As an example, a user may attempt to access data in a corporate database from an office computer and a home computer via a virtual private network ("VPN"). If the database has entities for users, but not for network attributes (say IP address of a request), the database management system will only be able to restrict access to the data based on the user, not the location from which the user is attempting to access the data. In order to restrict access based on a request generated by a local LAN versus over a VPN, new entities would have to be created in the database to implement the security constraint. Under this model, effective management of security would require predicting which entities are necessary in the database to apply security constraints. However, as individual components on the network are arbitrarily used, the behavior of the aggregate system is changed in ways that are impossible to predict from a practical standpoint. Consequently, a security model that relies solely on entities known to the database management system is insufficient for robust security in a networked environment.

Another obstacle in enforcing database policies in a networked environment involves performance-sensitive computations. To allow for more flexible configuration and operation, many computer-based database appliances are adding policy-based controls to allow their administrators to define appropriate constraints on operations. For appliances that are monitoring and/or securing performance-sensitive data flows, the number of comparisons between input data and policy criteria has a significant impact on the performance and domain of applicability of the solution.

Traditional hardware-based optimizations to improve throughput involved committing significant hardware resources to the problem (parallel processing systems, etc.) or using hardware components such as FPGAs that are dedicated to processing this type of traffic. Software optimizations, on the other hand, typically revolve around compiler optimizations that improve the straight-line performance of code by cleverly arranging loops or tree-based comparison algorithms that allow the coder to divide the problem into more manageable sizes.

SUMMARY OF THE DISCLOSURE

Embodiments disclosed herein can provide systems and methods that can eliminate or reduce the disadvantages of previously developed database security systems and methods. More particularly, embodiments disclosed herein provide systems and methods for analyzing, summarizing, and reporting the impact of database statements at a database appliance in a networked environment.

In one embodiment, a database appliance resides between a database client and a database server and comprises a processor, a computer readable memory accessible by the processor and a set of computer instructions stored on the computer readable memory. The database appliance can receive a database request and determine a set of information related to the request. More specifically, the set of computer instructions can comprise instructions executable by the processor to determine the set of information related to the request received by the database appliance. The set of information may include information retrieved from an information system external to the database client and the database server. Based on the set of information related to the database request, the database appliance may apply one or more policies to determine whether to allow the request (e.g., a request to modify a record in a database).

Embodiments disclosed herein can take in as input the database statement text and output multiple impact vectors, each containing both the name of an affected entity and a "impact bitmap" for that entity. In one embodiment, the database statement is in Structured Query Language (SQL). In one embodiment, the impact bitmap is represented via a 32-bit vector. The impact vectors according to some embodiments can be computed using fast AND, OR, XOR, and NOT operations.

Embodiments disclosed herein can provide many advantages. For example, each impact bitmap can accurately reflect the impact of a database statement in a concise and unambiguous manner. The less confusion and ambiguity, the more efficient the database statement can be evaluated against security policies. More efficient evaluations can improve the throughput of a database appliance. Additionally, as each bit in an impact bitmap can represent specific information about an entity, embodiments disclosed herein can enable finer policy granularity, which can add desirable sophistication to a database appliance.

Other features, advantages, and objects of the disclosure will be better appreciated and understood when considered in conjunction with the following description and the accompanying drawings.

BRIEF DESCRIPTION OF THE DRAWINGS

A more complete understanding of the present invention and the advantages thereof may be acquired by referring to the following description, taken in conjunction with the accompanying drawings in which like reference numbers indicate like features and wherein:

FIGS. 6-9 show examples of types of impacts of database statements that can be reported to a policy engine according to some embodiments disclosed herein.

DETAILED DESCRIPTION

Preferred embodiments of the present invention are illustrated in the FIGUREs, like numerals being used to refer to like and corresponding parts of the various drawings.

Broadly speaking, embodiments of the present invention provide systems and methods for leveraging information about a networked environment to apply security policies to database requests. According to one embodiment of the present invention, a database appliance resides at a choke point to a database server and receives activity requests to the database server. For a database request, the database appliance can apply policies to the request to allow the request, deny the request or take some other action based on information related to the request including information in the request, metadata corresponding to information in the request or other information related to the request. The database appliance can utilize network information maintained by other systems (e.g., network servers, domain servers, identity management systems and other systems) to apply policies that account for the complexity of the aggregate network. The processing involved in applying policies to a request optionally can be optimized for processing by a single instruction, multiple data ("SIMD") processor. As an artisan can appreciate, specific instances disclosed herein (e.g., bit vectors, SIMD, etc.) are meant to exemplify the present invention's techniques in transforming policies and requests into forms optimized for efficient matching. These intermediate forms are amenable to both general parallel processing techniques and to SIMD processing techniques in particular.

Figure 1:
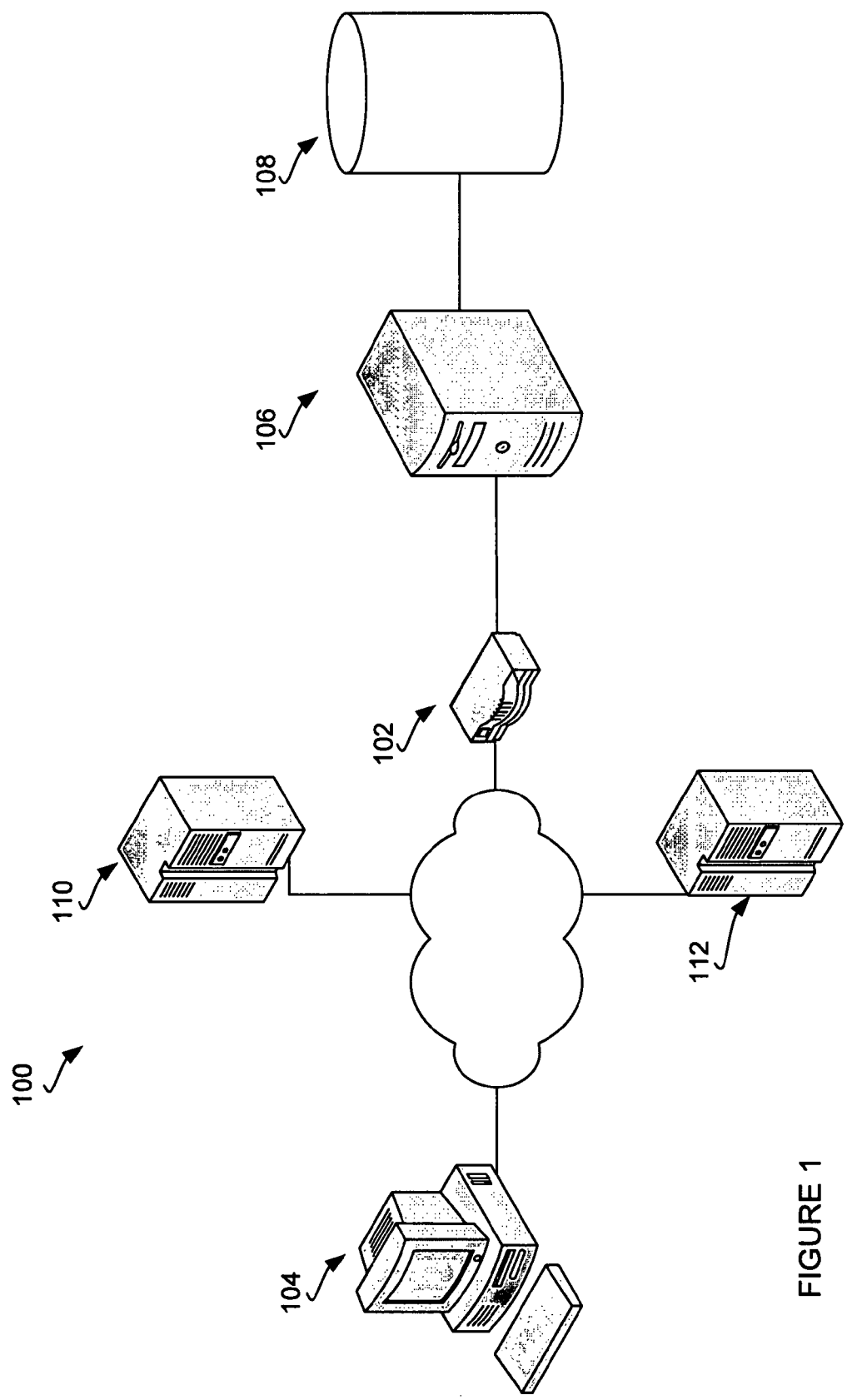
FIG. 1 is a diagrammatic representation of one embodiment of a system in which embodiments of the present invention can be implemented.

FIG. 1 is a diagrammatic representation of a simplified system 100 including a database appliance 102, a database client 104, a database server 106 that manages database 108 and information systems 110 and 112 that maintain metadata about users, the aggregate network environment or other information. According to one embodiment, database client 104 and database server 106 can be a standard database client 104 and database server 106 that do not require special configuration (i.e., they can include "off-the-shelf" software). In other embodiments, database client 104 or database server 106 can include proprietary configurations. In general, database client 104 is configured to generate requests, such as SQL requests or other database requests, to database server 106 via a network (e.g., a LAN, the Internet, a wireless network or other network known in the art). Database server 106 is configured to receive and process the requests to perform functions (e.g., create, read, update, delete or other functions) on data stored in database 108.

Database server 106 defines various database entities including, but not limited to, tables, columns, procedures, schemas, catalogs, users, indexes, views, constraints, protocol version, protocol options and other database entities. Server 106 can apply standard database security mechanisms to activity requests from database client 104 in terms of entities known to database server 106. Additional (or all) security policies can be applied by database appliance 102 as discussed below to allow or deny requests by database client 104 to database server 106.

Database appliance 102 is preferably placed at a control point to database server 106 such that all requests to database server 106 pass through database appliance 102. For example, database appliance 102 can be placed between the ports of database management system (i.e., the ports of a database server) and the rest of the network. From the perspective of database client 104, database management system 106 is behind database appliance 102. In more complicated network architectures, multiple database appliances 102 can be deployed at multiple control points for database management system 106. Database appliance 102 can apply policies to activity requests from database client 104 directed to database server 106 to determine whether to allow the requests, deny the requests or take some other action.

Database appliance 102, according to one embodiment of the present invention, can maintain mappings of database entities and information contained in database requests to metadata defined at database appliance 102. For example, every entity known to database server 106 can be mapped to a human readable name (e.g., the entity "PRM_CFACBS" can be mapped to the name "Primary Customer Table"). Just as database entities can be mapped to human-readable names, groups of entities, users, columns, etc. can also be created, named, edited and managed. For example, users can be mapped to user groups, departments or other aggregations of users, database tables can be mapped to an Accounts class of tables or other business category, IP addresses can be mapped to computer groups, VPN connections or other category of addresses and so on. Thus, specific pieces of information can be mapped to metadata, such as category names etc., defined external to database server 106.

Additionally, metadata from information systems 110 and 112 can be utilized by database appliance 102. Information systems 110 and 112 can be any systems, such as metadata repositories, external to database appliance 102 with which database appliance 102 communicates to retrieve information for implementing policies. Table 1 below lists several example information systems and the types of metadata maintained. It should be noted, however, system 100 can include any number or types of information systems and that the information systems can include additional information than the example information provided by Table 1:

TABLE 1

| Information System | Information |
| --- | --- |
| LDAP | LDAP servers maintain directory information about data elements such as organizational units, printers, documents, groups of people and other information. |
| Identity Management | Identity management servers generally are built on top of directory services systems such as LDAP servers and may maintain information regarding users, accounts, passwords, privileges, provisioning processes, deactivation processes and platforms. |
| Database Servers | Database servers can maintain information about users, privileges, LDAP server connections, entities maintained by the database and other information. |
| Domain Name Servers | IP address to Name Mappings. Domain Name Servers can maintain information about IP Address to System Name translations. |
| File Servers | Network File Servers can maintain export information about the availability of space, allowed users, etc. |
| Network Time Protocol | Network Time Protocol Servers export the current time. |
| Application Servers | Application Servers are typically the front-end to databases. Applications servers can maintain a variety of application dependent information. |

Table 1 is provided by way of example and not limitation. Additionally, database appliance 102 can utilize various systems management protocols such as SNMP to derive, for example, information about its own health.

To the extent desired, the names or other metadata used by network services, directory services or other information systems and database server 106 can be used by database appliance 102 in applying policies to requests and database appliance 102 can simply maintain incremental metadata. For example, database appliance 102 can map between a user (i.e., an entity defined at database server 106) to a user group defined by an identity management system (e.g., a group defined at information system 110). Again, in this case, the database entity is mapped to an object defined external to database server 106 using metadata that, in this example, is maintained by information system 110.

The mappings can be arbitrarily complex and hierarchical. For example, a user can be mapped to a group, the group to a corporate division and so on. As database entities can be mapped to metadata or other information defined in information systems 110 and 112, security policies can be implemented in terms of the highest level metadata available across network management systems, directory services systems and database systems.

According to one embodiment, database appliance 102 can access information systems 110 and 112 to obtain metadata. If, for example, information system 110 is an identity management system, database appliance 102 can pull metadata such as user groups from information system 110. Access can be achieved through the API calls for information system 110 or other suitable access scheme known or developed in the art. The metadata retrieved from information system 110 can be maintained by database appliance 102 (e.g., in a dedicated database, in memory or otherwise maintained) for some period of time or deleted from database appliance 102 or the data store of database appliance 102 when no longer needed.

When database appliance 102 needs the metadata again, database appliance 102 can request the metadata from information system 110 again.

In operation, database appliance 102 can receive requests from database client 104 to database server 106. Each request, according to one embodiment, can be normalized to a preferred format and parsed to extract information. Each request can include a variety of information, including target (database server) IP address, source (database client address), target IP port number, target database name, statement type, procedures executed, tables to be accessed, columns to be accessed, tables to modified, columns to be modified, procedures to be created, database errors, rows of data to be returned, time of the request, user identifier and other information contained in the request. Table 2 below provides a summary of information that database appliance 102, according to one embodiment, can derive from each request:

TABLE 2

| Information From Request | Description of the Information |
| --- | --- |
| Requester IP Address | The network address of the computer issuing the request |
| Database IP Address | The network address of the database system to which the request is directed |
| Database Instance | The particular database instance on the machine with the given Database IP Address |
| Impact of the Request | Each database activity request has one or more impacts on the database itself. The collective impact of request can be determined. |
| Target Database Entities by Impact | For each form of impact, the database target entities involved. |
| Time/Date | The time/date of the activity request. |

Using the example of FIG. 1, the first two items in Table 2 relate to the logical network address of database client 104 and database server 106, respectively. One skilled in the art can appreciate that embodiments disclosed herein are not limited to IP networks and can be readily implemented for non-IP networks. Accordingly, network addresses in the examples described herein (e.g., the network address of the computer issuing the request, the network address of the database system to which the request is directed, etc.) are not limited to IP addresses. Other non-IP network addresses may also be utilized. Additionally, there may be more than one database instance residing on database server 106 and a single database may be reached at more than one network address. The third item of Table 2 indicates the database instance to which the request is directed. The fourth item in Table 2, discussed below, relates to the overall impact (i.e., effect) a request has on a database. The fifth item relates to the entities of the database affected. The last item in Table 2 relates to the time/date of the request.

Returning to the database activity request impact, the structure of a database, generally speaking, is a mix of containment relationships and reference relationships. At the highest level of organization, it is the containment relationships that dominate. From the standpoint of the ANSI/ISO SQL standards, database activity requests are SQL operations and are interpreted in a "SQL-environment." Such an environment, in turn, contains one or more "catalogs," which in turn contain one for "SQL-Schema" elements. Database objects, such as tables, columns, views, and stored procedures are contained in the SQL-Schema entity. Columns and rows are contained in the table entity. Within a schema, table objects are related to one another by means of reference relationships. Some database implementations omit some of these levels. For example, some database implementations omit the catalog level in the hierarchy.

Database activity requests can range from the very simple to the very complex. A request such as:

SELECT COUNT (*) AS NUM_ROWS
FROM SUPPLIER simply reads the rows in the table "SUPPLIER" and counts them. The request:

SELECT SUPPLIER.SUPPLIER_NUMBER
FROM SUPPLIER WHERE SUPPLIER .STATUS <
 (SELECT MAX (SUPPLIER.STATUS)
 FROM SUPPLIER)

contains a sub-select and corresponds to finding the supplier identifiers associated with those suppliers whose current status is less than the maximum status for any supplier. As a final example, the request:

UPDATE PART
SET CITY=(SELECT SUPPLIER.CITY
 FROM SUPPLIER
 WHERE SUPPLIER.SUPPLIER_NUMBER='42 ')
WHERE PART.COLOR='RED' updates the "CITY" column for all rows in the PART table, where the column COLOR has the value Red, to the supplier city taken from the supplier table where the SUPPLIER_NUMBER equal to 42. The complexity of a single statement can become enormous with thousands of lines of SQL code referring to thousands of tables, views, columns, schemas, or other entities.

In some embodiments, database appliance 102 can parse the request and determine, at the statement level, the impact of the request along with the database entities that are affected. Table 3 below provides exemplary request impacts that can be defined by database appliance 102 to a first level of granularity.

TABLE 3

| Request Impact | Description of Impact |
| --- | --- |
| Read/Query | Corresponds to a "SELECT" action. The affected entities include the table read as well as the specific columns accessed. |
| Minor Data Create | Corresponds to an "INSERT" action. The affected entities include the table to which rows are added. |
| Minor Data Modify | Corresponds to an "UPDATE" or "DELETE" action. The affected entities include the table whose rows were updated or deleted and, in the case of an "UPDATE" the modified columns. |
| Mass Data Modify | Corresponds to a "TRUNCATE" action. The affected entities are the tables containing rows which are deleted. |
| Metadata Read Query | Corresponds to a "DESCRIBE" action. The affected entities include the table whose metadata is read. |
| Metadata Modify | Corresponds to a "CREATE", "ALTER" or "DROP" action. The affected entity is the target table. |
| Procedure Execute | Corresponds to the execution of a stored procedure. The affected entity is the procedure that is executed. |
| Procedure Modify | Corresponds to "CREATE" or "DROP" of a stored procedure. The affected entity is the procedure that is created or destroyed. |
| Permissions Manipulation | Corresponds to a "GRANT" or "REVOKE" of a permission held by a user. The affected entity is the user. |

One example of an "Impact of the Request" or "Request Impact" may comprise one 32-bit value and separate lists of the names of the affected entities (e.g., tables accessed, tables modified, columns accessed, columns modified, etc.). However, not all 32 bits were used for the entire statement. Embodiments described below can summarize and report the impact of a database statement with finer granularity than the first level of granularity exemplified above. More specifically, instead of the statement having a single 32-bit "impact" value, each of the individual entities (e.g., table, column, etc.) has its own 32-bit impact value. Also, since the impact bits in embodiments disclosed herein can indicate the type of impact (e.g., whether an entity was accessed, inserted, updated, or deleted), separate lists (e.g., "Accessed Columns", "Modified Columns", etc.) can be combined into a single "Columns" list with individual impacts. Moreover, the number of possible impact bits has greatly increased (from 5 to 13). Additionally, impacts can be defined in terms of operations specific to particular database implementations including, but not limited to, Oracle databases and IBM DB2 databases.

A request can have zero or more impacts depending on its nature and complexity. For example, a request to set a session's idle timeout period has zero impacts (i.e., has no effect on the underlying database system). On the other hand, the following example request ("UPDATE PART") would have multiple impacts (e.g., "Table Impacts" and "Column Impacts").

UPDATE PART
SET CITY=(SELECT SUPPLIER.CITY
 FROM SUPPLIER
 WHERE SUPPLIER.SUPPLIER_NUMBER='42 ')
WHERE PART.COLOR='RED'

Table Impacts
 Table Name="PART", Impact(s)=MODE_DML_UPDATE
 Table Name="SUPPLIER", Impact(s)=MODE_DML_ACCESS Column Impacts
 Column Name="CITY", Impact(s)=MODE_DML_UPDATE
 Column Name="SUPPLIER.CITY", Impact(s)=MODE_DML_ACCESS
 Column Name="SUPPLIER.SUPPLIER_NUMBER", MODE_DML_ACCESS
 Column Name="PART.COLOR", Impact(s)=MODE_DML_ACCESS In the above example, database appliance 102 determines additional information related to the request (e.g., request impacts) based on the information in the request (e.g., various SQL commands/statements). Database appliance 102 can also determine other information related to the request based on the mappings discussed above. For example, database appliance 102 can determine the user groups to which the user identified in the database request belongs and other information related to the request. Some of the information related to the request, but not directly contained in the request, can be retrieved from other systems such as identity management systems, LDAP servers and other information systems as discussed above.

The information related to the request can include characteristics of the request and request context characteristics. Examples of characteristics of the request include the user ID in the request or the user group to which the user ID belongs. Another example of a characteristic of the request is whether the requesting IP address corresponds to a computer in a particular group defined in a network services system or directory services system. Characteristics of the request include any information derivable from the network-level protocol exchanges associated with the request, including, by way of example, user credentials, logical network source addresses, physical network source addresses, low-level session characteristics, database entities that are the target of the request and the nature of the request's database activity. It should be noted that the database entities that are the targets of a particular request in some cases may not be determinable just from inspecting the request itself. Instead, the union of the request itself, session-level configuration and database entity mapping can be used to yield the collection of database entities that will be affected as well as the nature of the effect. Context characteristics include, but are not limited to, the time of day, macro-level session characteristics, previous requests and their disposition and other information. An example of a request context characteristic includes the sequence of previous requests made during a set of sessions, including those spanning multiple database servers and/or instances.

Turning now to the enforcement of policies, criteria for matching a policy can be defined in terms of the characteristics of a request or the context of the request. If the criteria of the request are matched based on the information related to the request, the policy defines the actions to be taken. Such actions include allowing the request, logging the request to an audit trail, generating alerts of various types, blocking the request or taking another pre-defined action. According to one embodiment, each policy applied by database appliance 102 can include a set of conditions defining what matches the policy and a set of actions to be taken should a match occur. The conditions that determine a potential match may be zero or more characteristics of the particular request made and zero or more characteristics of the context in which the request is made. To this end, each policy can include an activity request description that serves to determine the sort of database activity requests that are governed by the policy. The activity request description, according to one embodiment of the present invention, is an expression containing multiple fields describing matching conditions for several criteria. The activity request description definition can be made in terms of information maintained by database appliance 102 or other systems (e.g., information systems 110 and 112). Table 4 below provides exemplary fields and field descriptions for a policy's activity request description. Table 4 is provided by way of example and other activity request descriptions (e.g., the application name of the database client) can be utilized by database appliance 102.

TABLE 4

| Field | Description of Field |
| --- | --- |
| User | Corresponds to the user making the database activity request. It can include one or more specific users or one or more user groups. |
| Network Address | Corresponds to the physical or logical source address of the network traffic associated with the request. It can include an explicit collection of MAC or IP addresses, a range of addresses or a defined group of machines. |
| Database Action | Corresponds to the actual activity being denoted by the request: SELECT, INSERT, CREATE, DELETE, SET, etc., a request impact or a collection of activities. |

TABLE 4-continued

| Field | Description of Field |
| --- | --- |
| Database Target | Corresponds to the database entity that is target of the request action or affected by the impact. This can include individual database entities or some group of entities. |
| Time/Date | Corresponds to the time/date of the database activity request. This can include a discrete time, a collection of time/date ranges with or without recurrences or other time/date definition. |

Assume that a company has a policy that database maintenance takes place during the hours of 8:00 AM to 2:00 PM Eastern on Saturdays and must be initiated either directly on the database server or directly on the database administrator ("DBA") subnet. The policy may map to fields of Table 4 as follows:

User—The policy applies to all users so the field can be left blank or an indicator of all users provided;

Network Address—The IP range for the DBA subnet can be given with the additional annotation of "NOT" to indicate that addresses outside of the range are affected;

Database Action—All Data Definition Language (DDL) and Data Control Language (DCL) constructs can be flagged;

Database Target—The policy applies to all entities within the database so the field can be left blank or an all entities indicator provided;

Time/Date—The time range of 13:00-19:00 GMT on Saturdays can be specified.

Database appliance 102 can examine requests against this example policy and deny requests that match the policy.

In enforcing policies, database appliance 102 can utilize the information related to the request including metadata from information systems 110 and 112. Using the previous example, assume information system 110 includes an active directory server that defines which computers belong on the DBA subnet. The Network Address field may simply list DBA Subnet, rather than an explicit IP address range. When database appliance 102 receives a request, database appliance can make a function call to the active directory server of information system 110 to query whether the IP address of the request is part of the DBA Subnet. Thus, the policy can be applied in terms of metadata maintained by information system 110 rather than database server 106. According to other embodiments, database appliance 102 can pre-fetch all the information it needs to enforce the defined policies. In this example, database appliance 102 can pre-fetch the metadata defining which IP addresses correspond to the DBA subnet so that it does not have to consult information system 110 each time a request comes in.

As another example, assume a company has a policy that engineers can access a design table from computers connected via the engineering group LAN and database appliance 102 receives a request from user1 at IP address 168.191.1.5 to access the design table. Database appliance can make a request to information system 110 to determine if user1 is in the engineering group and make a request to information system 112 to query whether the address 168.191.1.5 is on the engineering group LAN. If, based on the metadata maintained by information systems 110 and 112, the answers to these queries are both true, the policy is satisfied and the request can be allowed. In the above example, the requests are allowed if the policies are met. However, the policy can define some other action to take such as denying the requests, beginning an audit trail or generating an alarm.

In some embodiments, a second type of user may be reported. As described in Table 4, a first field, named "User", may refer to the user performing the action (i.e., the user making the database activity request). A second field, named "Target User", may refer to a user who is affected by the database activity request. In some cases, there is a difference between the requesting user ("Actor User") and the affected user ("Target User"). For example, if User Scott executes an SQL statement to "GRANT PRIVILEGE TO USER Fred", then the Target User would be Fred.

According to one embodiment of the present invention, a request can first be compared to a set of enabling policies and then to a set of disabling policies. In this case, a request will be compared to a first set of policies and, if the request matches any of the policies, the request will be selected for further processing. If the request does not match any of the enabling policies, the request can be rejected. Once a request matches an enabling policy, it can be compared to a set of disabling policies. If the request matches a disabling policy, the request is rejected. If the request matches an enabling policy, but not a disabling policy, the request is allowed. The sequence of applying enabling and disabling policies can be repeated as desired.

Embodiments of the present invention thus allow security policies to be defined in terms of information available across the network management systems, directory services systems and database systems. For example, a security policy may state that so long as members of groups Y and Z are accessing the database servers computer systems in an address range R controlled by a network services system, a member of group Y (as defined by a directory services system) or a member of group Z (again as defined by the directory services system) is allowed (i.e., has the ability) to delete a row from a table in a database. As the definitions of Y, Z and R can be managed by the directory services system and network services system, the definitions of Y, Z and R can change without requiring an update to the security policy, database client or database server. Security policies can also be defined in terms of information that is defined at database appliance 102. This allows security policies to be enforced in terms of metadata and categories not otherwise defined in the aggregated network environment.

Figure 2:
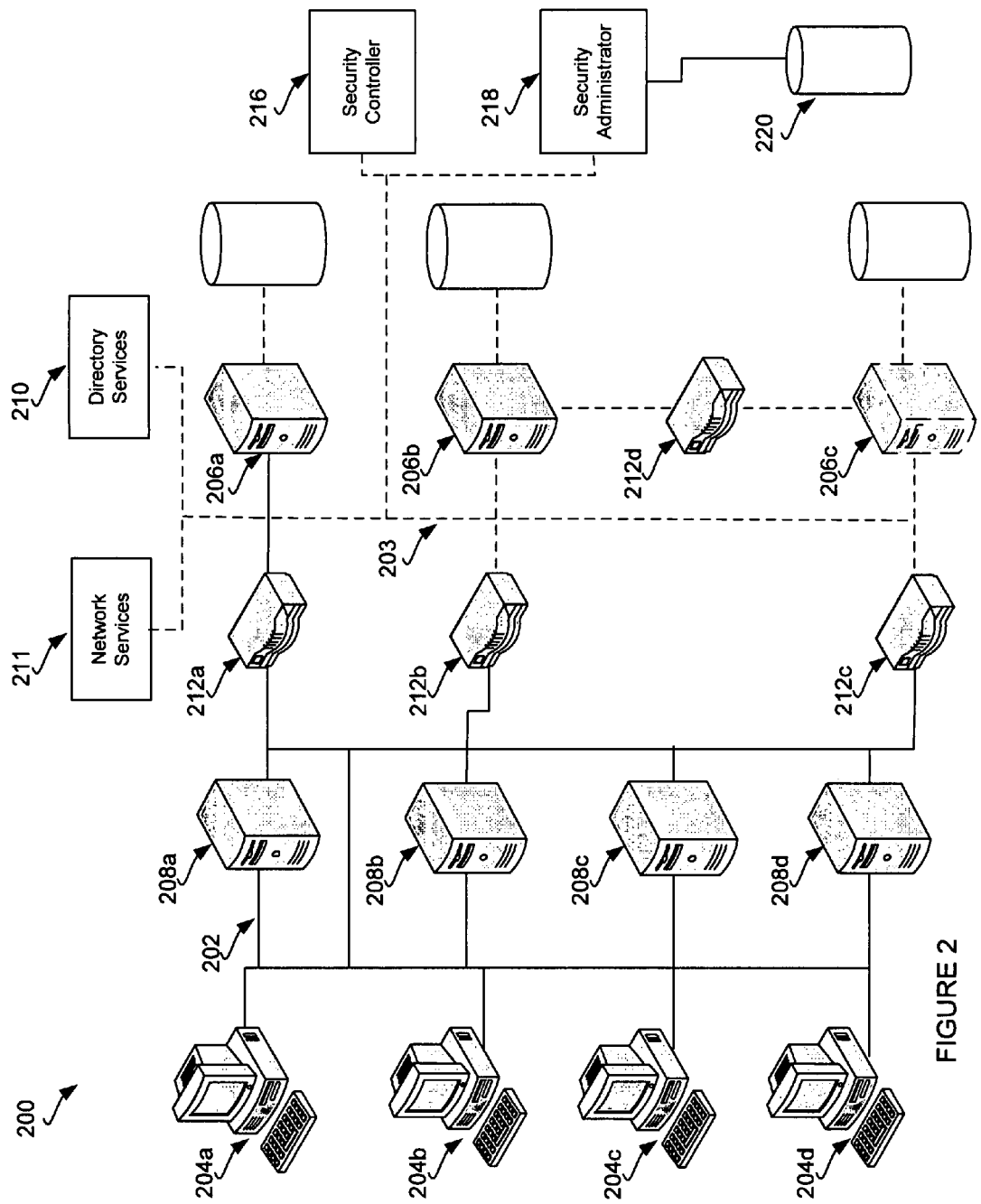
FIG. 2 is a diagrammatic representation of another embodiment of a system in which embodiments of the present invention can be implemented.

FIG. 2 is a diagrammatic representation of another embodiment of a system 200 in which embodiments of the present invention can be implemented. System 200 can include an open network 202 and a security network 203 (represented by the dashed lines). Security network 203 can share hardware with open network 202, but represents the connections between components for allowing enforcement of policies and connections between components behind the database appliances. Database clients 204a-d can communicate directly with database servers 206a-c or though intermediary application servers 208a-d. Application servers 208a-d can function as database clients even as they perform a server role for database clients 204a-d. Moreover, one database server 206 can act as a database client to another database server. For example, database server 206c can act as a database client to database server 206b. Database clients 204a-d, application servers 208a-d and database servers 206a-c can interact in the context of authentication and user account information provided by directory services system 210. The structure of network 202 itself is managed through network services system 211, which can itself be distributed.

According to one embodiment of the present invention, database appliances 212a-d can leverage the network access ports of database servers so that all requests to a database server must pass through a database appliance 212. In the example of FIG. 2, database appliance 212a is at the control point between application servers 208a-d and database server 206a, database appliance 212b is at the control point between application servers 208a-d and database server 206b, database appliance 212c is at the control point between application servers 208a-d and database server 206c and database appliance 212d is at the control point between database server 206c and database server 206b. Configuration and monitoring of database appliances 212a-d can be managed by one or more security controller applications (represented as a logical function at 216) that can run on one or more of database appliances 212a-d. A security administration application 218, which can run on one or more of database appliances 212a-d or an administrator computer, can communicate with and configure security controller application(s) 216. A security database 220 can maintain information utilized by database appliances 212a-d. The security components can communicate with directory services system 210 and network services system 211 to leverage metadata maintained by these systems.

As discussed in conjunction with FIG. 1, embodiments of the present invention allow security policies to be imposed in terms of metadata or other information maintained across network services, directory services and database servers. To the extent desired, existing names at database servers 206a-c, directory services system 210 and network services system 211 can be used and the incremental metadata (any metadata used for policies not already defined in the other systems) can be defined through security administration application 218 and stored in security database 220. The metadata in security database 220 can be single-level metadata or multi-level metadata for defining groups of entities that may be nested and may span multiple database servers.

Each database appliance 212 can receive requests directed to the respective database server 206 and apply policies using metadata or other information maintained at that database appliance, security database 220, network services system 211, directory services system 210 and database servers 206a-c. The security policies applied by database appliances 212a-d can be in addition to or in lieu of security policies applied by database servers 206a-c. Thus, embodiments of the present invention can complement or replace existing database security policies.

Figure 3:
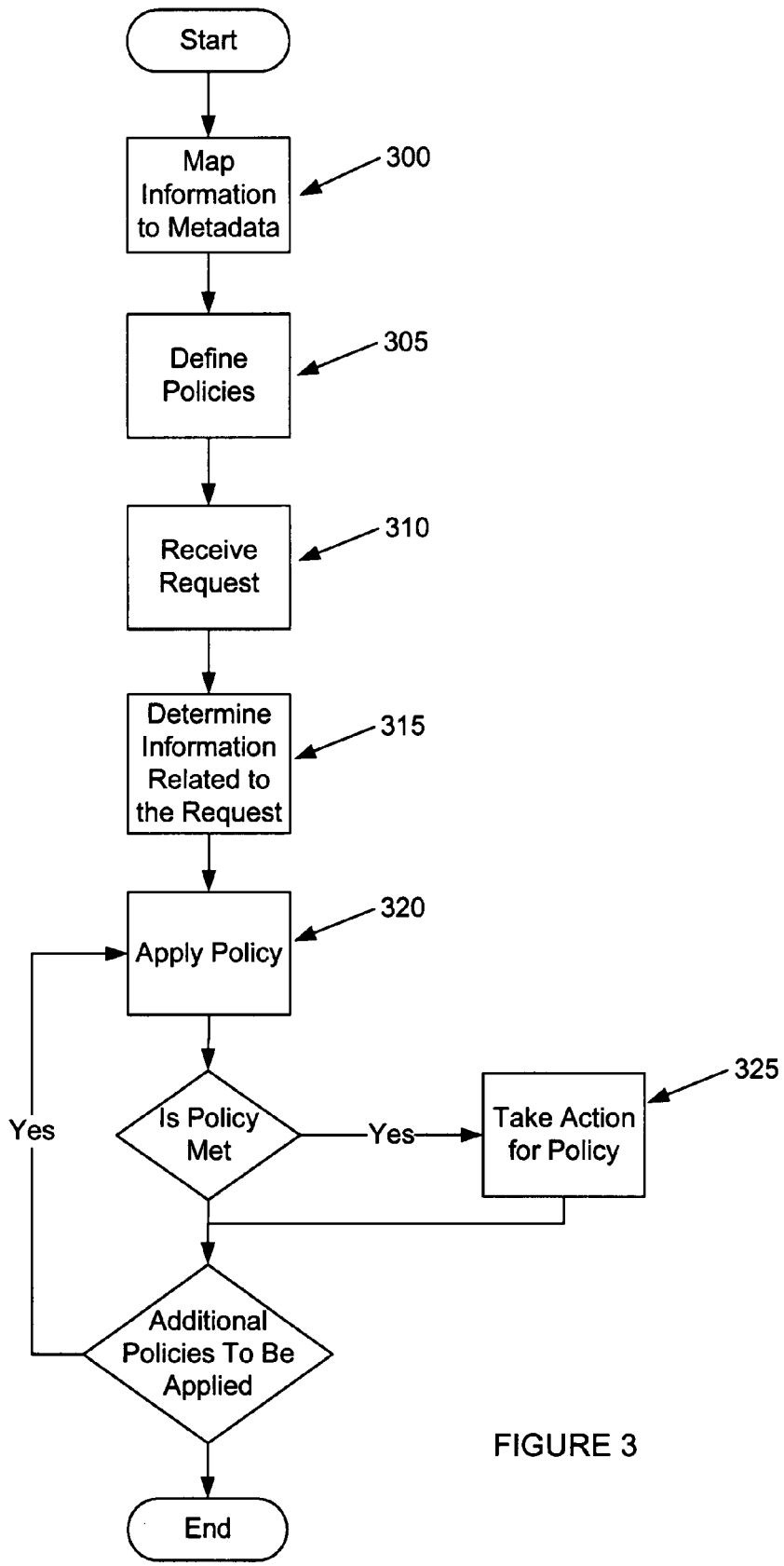
FIG. 3 is a flow chart illustrating one embodiment of a method for implementing security policies.

FIG. 3 is a flow chart illustrating one embodiment of a method for implementing security policies. The method of FIG. 3 can be implemented as a set of computer instructions stored on a computer readable medium (e.g., at a database appliance) that are executable by a computer processor.

At step 300, one or more pieces of information discoverable or derivable from a database action request and information regarding the context of requests can be mapped to information defined external to the database for which policies are being implemented. For example, database users can be mapped to groups (or to user-understandable names that are in turn mapped to groups), IP addresses can be mapped to departments, times can be mapped to time ranges and so on. The mappings can be defined by the database appliance enforcing policies or defined at other systems external to the database system and database appliance and can be arbitrarily complex or hierarchical.

At step 305, a set of policies can be defined at the database appliance. Each policy can include a specification of the type of activity request to which it applies and the action to be taken if the policy is met. The location of the information needed to enforce a policy can be specified as part of the policy or can be otherwise specified. For example, if a policy relies on information held at an external system, such as an LDAP server, access credentials and protocols for that server can be specified at the database appliance. The information from the external system can be preloaded at the database appliance or the database appliance can access the information as needed. According to other embodiments, the database appliance can access a security database that either replicates the information at the external system or includes incremental metadata.

The database appliance, at step 310, can receive a database request from a database client and, at step 315, determine a set of information related to the request. This can include determining the metadata or other information related to the request according to the mappings as defined at step 300. At step 320, the database appliance can apply the defined policies to the request. Accordingly, the database appliance can compare the information related to the request to the conditions of each policy to determine whether the conditions are met. As described below, this comparison can be optimized for SIMD processors. According to one embodiment, the database appliance can first apply a set of enabling policies and then disabling policies.

At step 325, an action can be taken based on which policies are met. In the case in which enabling policies are applied first and then disabling policies applied, the request will be allowed if at least one enabling policy is met, but no disabling policies are met. Otherwise the request can be denied. Other actions can also be taken, such as generating alarms and so on. While various steps are discussed separately above, the steps can be performed together or in different orders. The steps of FIG. 3 can be repeated as needed or desired. Moreover, multiple steps can be performed together. For example, the database appliance can determine information related to the request as part of applying a policy to the request.

Figure 4:
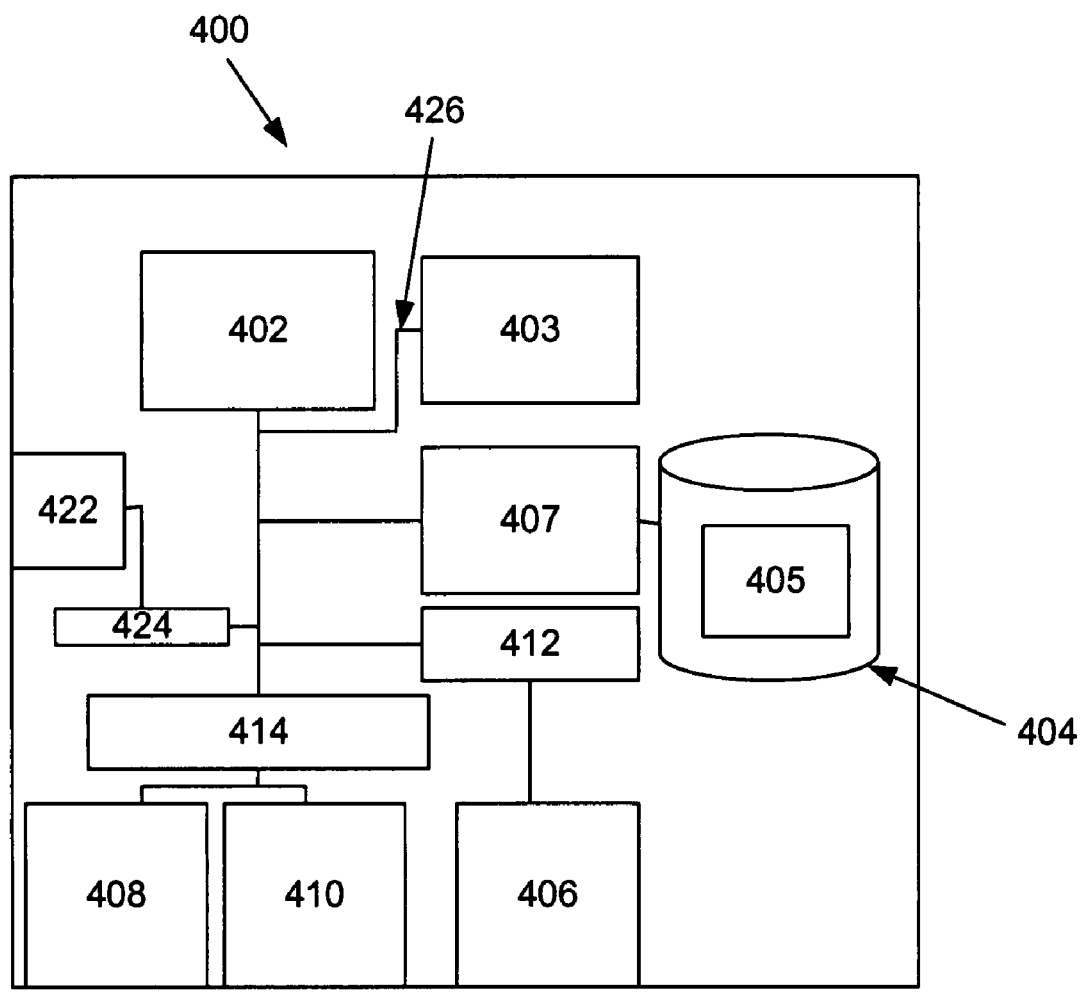
FIG. 4 is a diagrammatic representation of one embodiment of a database appliance.

FIG. 4 provides a diagrammatic representation of one embodiment of a computing device 400 that can act as a database appliance. Computing device 400 can include a processor 402 (e.g., an AMD Opteron™ processor by Advanced Micro Devices, Inc. based in Sunnyvale, Calif., or any processor capable of SIMD execution), an ASIC, a RISC or other processor known in the art, a primary memory 403 (e.g., RAM, ROM, Flash Memory, EEPROM or other computer readable medium known in the art) and a secondary memory 404 (e.g., a hard drive, disk drive, optical drive or other computer readable medium known in the art). A memory controller 407 can control access to secondary memory 404. Computing device 400 can include I/O interfaces (e.g., video interface 406 and universal serial bus ("USB") interfaces 408 and 410) to connect to input and output devices. In one embodiment, a video controller 412 can control interactions over the video interface 406 and a USB controller 414 can control interactions via USB interfaces 408 and 410. One embodiment of the invention can be implemented without video interface 406. Computing device 400 can include a variety of input devices such as a keyboard and a mouse and output devices such as display devices. Computing device 400 can further include a network interface 422 (e.g., an Ethernet port or other network interface) and a network controller 424 to control the flow of data over network interface 422. Various components of computing device 400 can be connected by a bus 426.

Secondary memory 404 can store a variety of computer instructions that include, for example, an operating system such as a Windows operating system (Windows is a trademark of Redmond, Wash. based Microsoft Corporation) or a Linux operating system and applications that run on the operating system, along with a variety of data. More particularly, secondary memory 404 can store policy engine application 405. During execution by processor 402, portions of database appliance applications 405 can be stored in secondary memory 404 and/or primary memory 403. Database appliance applications 405 can be implemented as multiple programs, a single program or according to any suitable programming architecture and language(s) known in the art.

Computing device 400 of FIG. 4 is provided by way of example only and it should be understood that embodiments of the present invention can implemented as a set of computer instructions stored on a computer readable medium in a variety of computing devices including, but not limited to, servers, routers or other computing devices in the request path between a database client and database server. Moreover, the embodiment of FIG. 4 is provided by way of example, and can comprise other components and can have a variety of form factors. In one embodiment, the database appliance is rack mounted server and has a height of approximately one height unit.

Although a particular embodiment of database appliance is described in conjunction with FIG. 4, embodiments of the present invention can be implemented in any database appliance or device in the message path between a database client and database server. Example database appliances are described in U.S. patent application Ser. Nos. 11/153,873; 10/375,393; 10/933,790; 10/933,786; 10/441,714; 10/934, 887, each of which is fully incorporated herein by reference.

According to one embodiment of the present invention, the database appliance can normalize a received database request to a preferred format and parse the normalized requests to extract information, such as user names, SQL statements and other pieces of information. Using the information in the request and other information, the database appliance can determine additional information related to the request, including additional request characteristics and request context characteristics. The database appliance can then apply policies to the request. According to one embodiment of the present invention, processor 402 utilized by the database appliance for applying policies can be a SIMD-capable processor. Pre-processing of the policies and request(s) transforms them into a form that is highly amenable to parallel processing, including SIMD-style parallel processing.

Figure 5:
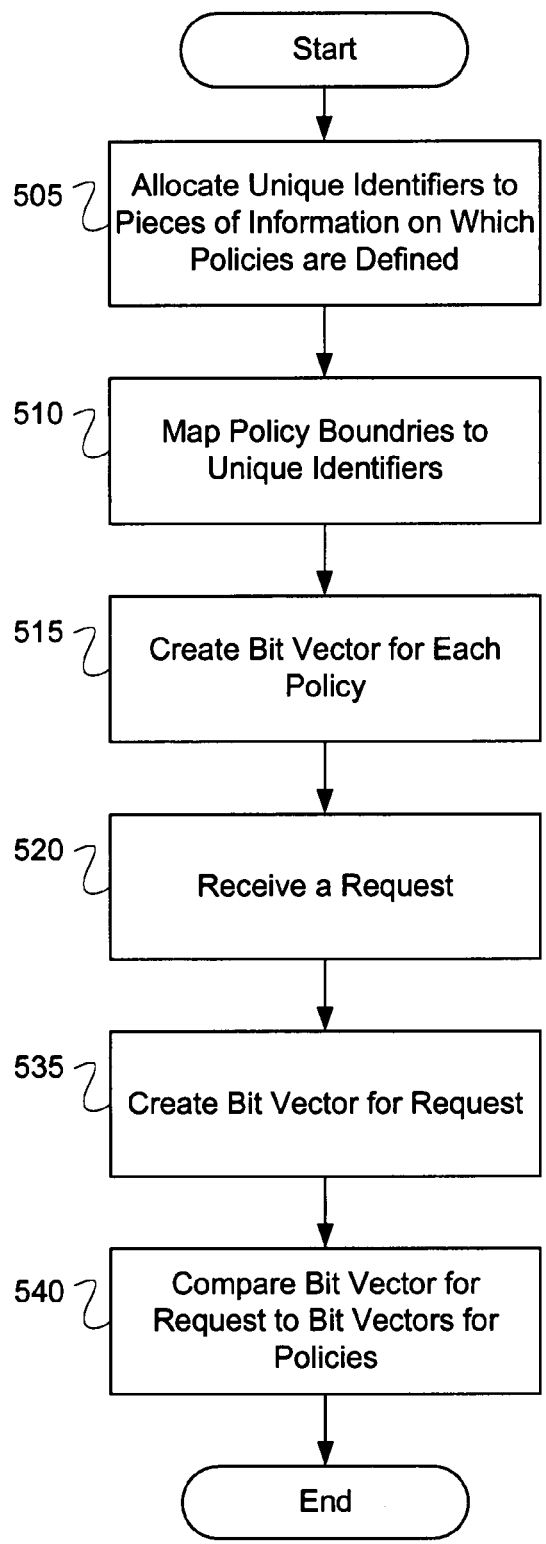
FIG. 5 is a flow chart illustrating one embodiment of a method for optimizing the application of security policies for a single instruction multiple data processor.

FIG. 5 is a flow chart illustrating one embodiment of a method of processing some steps of FIG. 3 (e.g., defining policies, evaluating an incoming request against defined policies, etc.). The method of FIG. 5 can be implemented according to one embodiment as a set of computer executable instructions stored on a computer readable storage medium and executable by a SIMD-capable processor. Generally speaking, the approach involves separating the computation into three phases that are performed and re-performed at different points. The first two computations are performed to create data structures that enable application of efficient algorithms in the third computation which produces results directly related to the overall rules engine execution. Thus, according to one embodiment of the invention, the first two computations can be considered as pre-processing steps for the third computations.

At step 505, all of the pieces of information on which policies are to be defined are allocated a unique identifier. That is, each database entity, group, time range, or request characteristic or request context characteristic to which policies are applied is assigned a unique identifier such as a 32-bit integer value. As an example, an IP address for a machine in a normal network can be translated to a single 32-bit integer value, with two lookup functions, one of which takes the 32-bit integer and returns the IP address, the other of which takes the IP address and returns the 32-bit number. A first lookup function can take the 32-bit integer and return the IP address and a second lookup function can take the IP address and return the 32-bit number.

At step 510, all of the boundaries upon which each policy is defined are mapped into an identifier which can be compared in the policy enforcement phase to the identifiers created in step 505. To follow the IP address example, a policy can allow a request from a range of IP addresses. Each IP address allowed by the policy can be translated into a 32-bit value using the same transformation as the functions in step 505. So, if the IP address in the example of step 505 is approved under the policy, the IP address would map to one of the identifiers created in step 510 for the IP address policy.

At step 515, a bit vector is created for the policy. According to one embodiment, the bit vector for the policy is created with bits set for each identified piece of information in the policy definition being set to 1. For example, for each IP address in the policy, the appropriate bit is set in the bit vector to indicate that the policy applies to that IP address.

At step 520, the database appliance receives a request. As described above, a request can have zero or more impacts depending on its nature and complexity. Embodiments of the database appliance disclosed herein can determine, summarize, and report the impact(s) of a request. More details of this step are described below with reference to FIGS. 6-9. Additionally, the database appliance can examine the request and determine what information is related to the request, including the request characteristics and the request context characteristics. The pieces of information related to the request, including any impact(s) thereof, are translated into their representative 32-bit values. According to one embodiment, the translation function is the same as what is used in step 505 described above.

At step 535, a bit vector for the request is formed from the 32-bit values representing the pieces of information related to the request as determined by the database appliance. According to one embodiment, the bit vector for the request is created with bits set for each determined piece of information related to the request being set to 1.

At step 540, the bit vector for the request is compared to the bit vectors for the defined policies to determine whether there is a match. If there is a match, the appropriate action is taken as defined by the policy (e.g., the request is selected for further processing, the request is transmitted to the database server, the request is denied, an alarm is generated or other defined action taken). If the bit vector for the request does not match the bit vector for the policy, the bit vector can be compared to the next policy until a policy is matched or the policies exhausted. Again, however, the policies may be applied in rounds, with the first round of policies being enabling policies and the second round being disabling policies. The steps of FIG. 5 can be repeated as needed or desired.

As the above examples illustrate, in embodiments disclosed herein, the specifications of constraints can be transformed into representations that exploit both the characteristics of database systems and the hardware organization of modern SIMD-capable microprocessors. The characteristic of database systems that is exploited is the natural range of scale. Database systems are characterized by entities of different types: users, schemas, tables, columns, stored procedures, views, constraints, network addresses, applications, etc. Each of these individually have a maximum practical size that is quite small. Typical complex database systems may have 200,000 such objects while truly large systems may have 10 million. A database may have billions or trillions of actual data tuples, but these reside in a much smaller number of containing entities and are requested by a constrained number of users, applications, and systems. As a result, the entities and other objects to which a policy applies can be represented using 32-bit integers. Further, the policy can be represented in a fashion suitable for a matching computation through the use of a bit-vector. If the database entity "A" is mapped to integer "n" through this process, then if "A" was a participant in a policy the "n-th" bit in the bit-vector representation would have the value 1.

Each request is decoded and the information related to the request is mapped to the appropriate integer codes. This forms a numeric representation of the activity request. The numeric representation of the activity request is transformed into a bit vector and compared to the bit-vector representations of the policies. These comparisons and lookups are highly amenable to SIMD-style computational processes, including parallel search mechanisms, within modern SIMD-capable microprocessors (e.g., IA-32, IA-32e, AMD64, and PowerPC microprocessors, etc.) and thus can be readily implemented with general parallel processors and particularly SIMD-compatible processors, as well as other parallel processors known or developed in the art.

In some embodiments, the impact(s) of database statements can also be summarized, represented, and reported using 32-bit integers. To provide examples, embodiments of a system and method for summarizing and reporting the impact(s) of database statements described below are applied to databases using Structured Query Language (SQL). However, one skilled in the art can appreciate that embodiments disclosed herein can be readily adapted or otherwise implemented for other database languages that use a text-based format (e.g., XQuery). In some embodiments, the system and method for summarizing and reporting the impact(s) of database statements is realized with a special parser application ("parser") implementing a software algorithm, referred to herein as the composite reporting scheme. In accordance with the composite reporting scheme, the parser operates to summarize the effect ("impact") a given SQL statement (or batch of statements) will have in a concise and unambiguous manner, so that the database appliance can accurately and efficiently apply a security policy or policies to the statement or batch of statements as described above, further enhancing the security of the electronic database coupled to the database appliance. In one embodiment, the parser application is part of database appliance application 405. In one embodiment, the parser application is stored on secondary memory 404. Features of the parser will be described in more details below.

Devising an output format that is both concise and unambiguous has been a challenge in summarizing and reporting the impact(s) of database statements. Past implementation attempts at summarizing the impact of SQL statements have included two approaches. The first approach tries to assign a single "statement type" to the SQL statement based on SQL keywords within the SQL text (e.g., SELECT, INSERT, UPDATE, INSERT, etc.). However, this approach fails when a complex SQL statement is encountered (e.g., INSERT FROM SELECT). The presence of more than one SQL keywords within a single SQL statement creates an ambiguity in assignment. Moreover, some SQL servers support multiple SQL statements in a single batch. Thus, it is possible that a client could send a single command to a database server which contains a SELECT, an INSERT, and so on all at the same time. The second approach tries to assign "SQL impact bits" to an SQL statement as a whole. More specifically, each SQL statement, including complex ones, is effectively condensed down into a 32-bit integer and a list of affected database entities (e.g., tables, columns, etc.). One weakness of this approach is the lack of granularity. The 32-bit integer and entity list do not provide sufficient details in fine granularity about the impact(s) of the SQL statements. That is, the impact integer may have a set of 5 or 6 bits that applied to the SQL statement as a whole, without regard to the individual impacted entities and without regard to specific database operations (e.g., insert versus update versus delete). For example, a single SQL command may read from one database table but write to another. However, this approach would produce only a 32-bit integer and a list of two tables, indicating that the SQL statement involves a read and a write and two tables. There are no further details about the impact of the SQL statement (e.g., which table was read and which table was written). The lack of granularity and clarity in summarizing and reporting the impact(s) of SQL statement(s) is carried over to the bit vector of the request thus formed. Consequently, with this approach, when the bit vector of the request is compared to the bit vectors of the policies, the policy engine may miss or apply incorrect policy or policies to the request.

To overcome the limitations of the previous two approaches, embodiments of a parser implementing a system and method for summarizing and reporting database statement impact(s) may take in as input the SQL statement text and output multiple "impact vectors," perhaps at various levels of the database hierarchy, including the entity level. More specifically, instead of one 32-bit integer and a list of affected entities for the database statement (i.e., statement-level impact summary/report), embodiments of a parser described herein can analyze the impact(s) of the database statement and output one impact vector for each affected database entity type (e.g., catalogs, schemas, tables, columns, stored procedures, and database users, etc.) at the entity level according to a composite reporting scheme. Each impact vector would contain both the name of the affected entity and a corresponding 32-bit "impact bitmap" for that specific entity. In some embodiments, the impact vectors can be computed using standard SQL parsing techniques via standard software tools such as gnu flex and bison known to those skilled in the art. For example, as described below, many operations on impact bitmaps can be computed using fast AND, OR, XOR, and NOT operations. By utilizing impact bitmaps, embodiments disclosed herein allow for very efficient evaluation of SQL statements against user defined policies. Further, the utilization of individual impact bitmaps, one per an affected entity, provides the fine-grained resolution that is missing in the previous implementations. The fine-grained resolution also allows for very fine-grained policies to be defined and implemented at a database appliance. Compared to a potentially large (>1K bytes) SQL statement, the utilization of small impact bitmaps as a representation of its impact allows for more efficient archiving of statement activity as well.

In some embodiments, a parser implementing the composite reporting scheme operates to parse the SQL statements received at a database appliance and report the impact(s) to a policy engine. As each SQL statement is parsed, events are fired reporting snippets of information about the SQL statement's total impact. In one embodiment, the composite reporting scheme comprises aggregating individual impact reports (e.g., via an ImpactTracker object) and making a composite set of impacts available to a set of computer-executable instructions called "stats". Within this disclosure, "stats" also refers to "Statistics", "stats code", or "stats layer". "Statistics" refers to a layer of software (code) that is architecturally above the protocol decoders and the parser, and below the policy engine. In some embodiments, additional reporting may be done by the protocol decoders. The "stats" code translates the impacts into the policy engine's preferred format (e.g., turning string names into actual statistics objects) and sends them onwards to the policy engine.

Embodiments of the composite reporting scheme disclosed herein have several features. First, the composite reporting scheme may enable a parser to always report impacts that are distinct from one another. That is, different database actions are reported differently. For example, TABLE impacts are distinct from COLUMN impacts not only because the impact bits are different, but also because they are reported on totally separate entity types. This also eliminates the need for different bits for PROCEDURE changes versus TABLE changes. To take advantage of this feature, impacts are reported on the most distinct entity possible. For example, an SQL command to CREATE TABLE would cause Table impacts, not just a Schema impact.

In embodiments disclosed herein, bits are created to report specific types of database change. For example, instead of simply indicating a modify mode with one bit (e.g., MODE_MODIFIED), three bits could be used to indicate whether the modification is an insert, a delete, or an update (e.g., MODE_DML_INSERT, MODE_DML_UPDATE, and MODE_DML_DELETE), thereby letting each type of change be treated differently. Similarly, different types of access may be represented with different bits. This provides a way for the database appliance to handle database statements having different "levels of severity" with respect to access. As an example, a bit indicating weaker access may have a name like WEAK, REFERENCE, INDIRECT, or POSSIBLE and a bit indicating stronger access may have a name like STRONG, ACCESS, DIRECT, or PROBABLE. Other names for the bits are also possible. In some embodiments, each WEAK/STRONG/INSERT/UPDATE/DELETE tuple now has DML, ACL, and DDL counterparts.

Within this disclosure, ACL refers to Access Control Language in SQL statements like GRANT, REVOKE, and DENY for managing permissions and capabilities. ACL is also used as the name of a "category" of MODE_XXX_YYY impact bits. Within this disclosure, DML refers to Data Manipulation Language in SQL statements like INSERT, UPDATE, SELECT, TRUNCATE, and DELETE. This term is used in relational databases to describe the language features oriented toards managing the content data of the database. Like ACL, DML also refers to a group of impact bits. Within this disclosure, DDL refers to Data Definition Language in SQL statements like CREATE TABLE, CREATE INDEX, and DROP TABLE. This term is used in relational databases to describe the language features that support defining the structure of the database. The term metadata is sometimes used to describe the "data" which is being managed by DDL. Like ACL and DML, DDL also refers to a group of impact bits. The term metadata refers to information maintained by a system that is about the (concrete) information maintained by a system. In the context of relational database systems, metadata is a set of data that describes, for instance, the tables and columns stored in the data base. In accordance with one of the guiding principles of relational databases, most relational databases store their metadata in concrete tables. For example, in Oracle, the table USER_TABLES stores information about the tables available to the user. The repository in a database where the metadata is stored is referred to herein as the data dictionary.

In some embodiments, MODE_DML$_{xxx}$ bits refer to changes to the actual contents of the database tables. That is, actual row and/or column values are read and possibly exposed to the user or written by statements having these impacts.

In some embodiments, MODE_ACL_xxx bits refer to changes in the permissions granted to objects. Here, GRANT is an example of a statement with MODE_ACL_INSERT impact and REVOKE is an example of a statement with MODE_ACL_DELETE impact.

In some embodiments, MODE_DDL_xxx bits refer to any changes not covered by the first two groups. This includes structural changes to an entity (e.g., adding a column to a table, removing a constraint, etc.) as well as other non-structural changes (e.g., altering the performance characteristics of a table by creating an index or computing statistics on the table). Here, CREATE TABLE is an example of a MODE_DDL_INSERT, ALTER TABLE is an example of a MODE_DDL_UPDATE, and DROP TABLE is an example of a MODE_DDL_DELETE. In one embodiment, "non-structural" DDL changes could be considered a fourth category of impact bits.

In some embodiments, the composite reporting scheme may enable a parser to always report impact on Procedure objects when they are invoked. In one embodiment, this can be implemented with one bit (e.g., MODE_EXECUTED) turned on to indicate the invocation of a stored procedure. This invocation impact bit is in addition to the DML, ACL, and DDL bits described above.

In some embodiments, the composite reporting scheme may enable a parser to always report immediate impacts only and not potential future impacts. For example, when reporting on CREATE FUNCTION FOO AS BEGIN SELECT * FROM DEPT; END, this database action may only have a Procedure impact of "FOO", MODE_DDL_INSERT. In this case, a Table impact of "DEPT", MODE_DML_ACCESS is not reported because this is what the impact will be if and when the function is executed, not when it is created.

In some embodiments, the composite reporting scheme may enable a parser to always report all potential impacts of Stored Procedures. It may also apply to the use of inline flow-control statements (e.g., by SQL Servers TSQL). For example, a stored procedure (not necessarily in true SQL):

BEGIN
   INTEGER X=1;
   IF X==1
   THEN
     SELECT * FROM DEPT;
   ELSE
     DELETE FROM EMP;
   ENDIF
END will cause impacts of "Table DEPT, MODE_DML_ACCESS" and "Table EMP, MODE_DML_DELETE" to be reported, even though only one of the two impacts is possible at a time. By inspection, it is possible to see that the select statement will always be the one executed.

In some embodiments, the composite reporting scheme may enable a parser to always report the impact on something (i.e., an entity) as an impact does not exist without having an entity associated therewith. In some embodiments, the composite reporting scheme is configured to handle certain types of vagueness scenarios. For example, when an impact cannot be tied to a specific entity at a given level in the hierarchy of the database, the composite reporting scheme may report on the next higher entity up. As a specific example, a request to CREATE USER SCOTT may have impacts at the user level (e.g., a User impact) and at the database level (e.g., a Database DDL impact). Some SQL commands may have database-wide effect(s). These are reported as Database impacts of MODE_DDL_xxxx. Another vagueness scenario may be that the exact entity is known, but it is unclear which impact bit should be set for a certain impact. As a specific example, a request to DROP INDEX DEPTNO_INDEX ON DEPT affects the table DEPT. In this case, the composite reporting scheme may operate to set the MODE_DDL_UPDATE bit on table DEPT.

In some embodiments, the composite reporting scheme may enable a parser to always report impact(s) on just about anything that a given SQL statement does that a policy engine might want to be able to block. An exception is that if a statement is determined to be truly harmless, no impacts are reported. An example of this exception is the TSQL "SET" command, which changes settings on a "per-session" basis, but has no lasting effect (i.e., no effect visible to other database users) on the database.

Some embodiments of the parser disclosed herein may report any impact on the most specific entity possible and only that entity. For example, changing the value of a column could be interpreted as a column change, and a table change, and a schema change, and a catalog change, and a database change. However, impact bits remain entity-specific and are not propagated up the hierarchy. This is because reporting impacts on the higher level entities may become common so as to render the report meaningless. For example, if everything is a "database impact", then there cannot be any policies disallowing database impacts. As another example, if it is possible to request SELECT COLUMN FOO without mentioning which table, then its impact would be reported as a column impact only. If both the table and column are mentioned in the statement text SELECT DEPTNO FROM DEPT, then both table impact and column impact would be reported. If the column names are not given and only the name of the table is in the statement SELECT * FROM DEPT, only table impacts may be reported. In some embodiments, additional column impacts can be detected and reported to the policy engine by the protocol decoders based on the returned result set. Other policy evaluations could also be done on the database server response. For example, a "post database server" policy evaluation may be performed if a particular database request is not blocked. In such a scenario, other factors such as database return code and number of rows in a result set could be considered after the database server has seen the client request. For the sake of brevity, aspects of policy evaluation will not be further described herein.

Some embodiments of the parser disclosed herein may be implemented as a standalone software module. In this case, only what can be gleaned from the actual SQL text is reported. Following the above example of SELECT * FROM DEPT, the parser would only report a table impact. Additional column impacts are detected by the protocol decoders based on the returned result set. Another example is in the handling of entity names without prefixes. As a specific example, for a statement SELECT DEPTNO FROM DEPT, the parser will report the column name as DEPTNO, not DEPT.DEPTNO. In this case, any sort of "stats tree lookup" is done up in the "stats" layer, not within the parser code. Specific examples of impact reporting on statement actions will now be described with reference to FIGS. 6-9.

Figure 6:
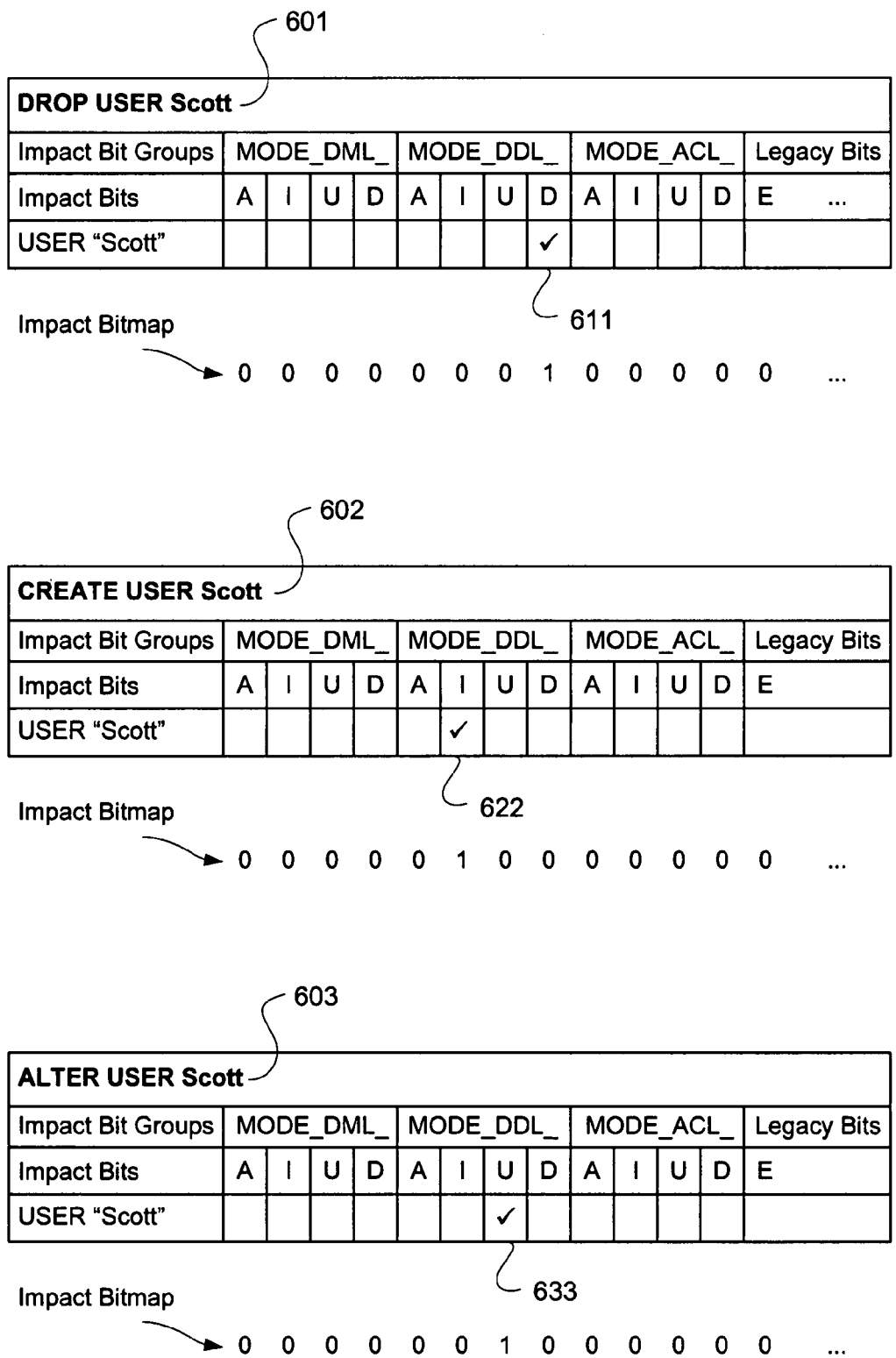

FIG. 6 shows examples of DDL impacts of database statements, according to one embodiment of the composite impact reporting scheme. Within this disclosure, the following conventions are used for FIGS. 6-9:

Within most "Impact Bit Groups":
  "W"=WEAK ACCESS. A type of impact which involves accessing the concrete data in a database, but only in an indirect manner.
  "S"=STRONG ACCESS. A type of impact which involves more-or-less direct access to the concrete data in the database.
  "A"=ACCESS, either WEAK or STRONG. This is used as a shorthand on some charts when neither occurs
  "I"=INSERT. A type of impact which involves creating new data in the database. In the case of DML, this type of impact is typified by the INSERT statement. For ACL, a GRANT statement is an insert.
  "U"=UPDATE A type of impact which involves changing existing data in the database.
  "D"=DELETE. A type of impact which involves removing information from the database.
  "E"=EXECUTED. A type of impact which involves executing a stored procedure. Database Entity names may include:
  "DB"=DATABASE
  "CAT"=CATALOG
  "SCH"=SCHEMA
  "TBL"=TABLE
  "COL"=COLUMN
  "PROC"=PROCEDURE/FUNCTION/etc.
  "USER"=ACTOR USER/TARGET USER In embodiments disclosed herein, not only the user who is causing the impact to happen can be reported (actor user), but also the user entity that is affected by the statement (target user). Within this disclosure, the terms "subject user" and "actor user" are used interchangeably. An actor user is a user who is creating an event. This event could be a SQL statement execution event or a logon event. For example, a user Alice issues a select statement SELECT * FROM foo. In terms of an English sentence, "Alice selects everything from foo," Alice is the subject of the sentence, to select is the verb and foo is the object. A target user is a user being impact by a SQL statement. For example, if user Alice executes a SQL statement GRANT ALL TO Bob, then Bob is the target user as he is the one to whom all rights are being granted. In English, the target user is the indirect object.

Referring to FIG. 6, USER Scott is the target user who is affected by SQL statements involving DDL impacts DROP, CREATE, and ALTER. One embodiment of a parser may parse statement 601, DROP USER Scott, determine that it has a DDL impact (Delete) on User Scott (an entity/object), and output an impact bitmap with impact bit 611 turned on. In a similar manner, the parser may parse statement 602 and statement 603, determine their DDL impacts (Insert and Update) on USER Scott, and output impact bitmaps with bit 622 and bit 633 turned on correspondingly. Impact bits are just that, "bits" and they are language and locale independent. Thus, there are no internationalization and/or localization issues in implementations. The names of the entities reported are subject to some restrictions. In some embodiments, they are in the UTF-8 character set, or ASCII.

As described above, impact bitmaps can be computed using fast AND, OR, XOR, and NOT operations. Suppose statements 601, 602, and 603 are in a batch of statements subject to policy evaluations, OR operations can be performed on their corresponding impact bitmaps to generate a composite report on the impacts of these statements. This eliminates the need for the policy engine to evaluate the impacts individually. As a specific example, after the OR operations, with bits 611, 622, 633 turned on and additional bits of zero padded, the composite impact report may comprise a 32-bit integer "00000111000000000000000000000000" for entity USER Scott.

FIG. 7 shows examples of ACL impacts (e.g., GRANT, DENY, REVOKE, etc.) of database statements, according to one embodiment of the composite impact reporting scheme. In FIG. 7, no distinction is made between DENY and REVOKE and the Delete bit is turned on for both statements REVOKE ALL FROM Scott and DENY ALL FROM Scott. Similarly, in FIG. 7, no distinction is made between types of GRANT statements and the Insert bit is turned on for all four GRANT statements (i.e., GRANT ALL TO Scott, GRANT SELECT To Scott, GRANT ALTER TO Scott, and GRANT ALTER ON Dept TO Scott).

Because impacts can be reported at the entity/object level, database-level and/or statement-level impacts need not be reported. However, high level symbols/names are allowed as some SQL statements can affect the entire database as a whole. Table 5 shows an example of mapping from impact names to impact bits. High level symbols indicated in Table 5 below correspond to the union of bits.

TABLE 5

| High Level Impact | | DML | | | | | DDL | | | | ACL | | | | |
| --- | --- | --- | --- | --- | --- | --- | --- | --- | --- | --- | --- | --- | --- | --- | --- |
| User Visible | Policy XML | W | S | I | U | D | A | I | U | D | A | I | U | D | E |
| Data Access | dml_access | ✓ | ✓ | | | | | | | | | | | | |
| Data Access (Weak) | dml_access_weak | ✓ | | | | | | | | | | | | | |
| Data Access (Strong) | dml_access_strong | | ✓ | | | | | | | | | | | | |
| Data Modify | dml_modify | | | ✓ | ✓ | ✓ | | | | | | | | | |
| Data Insert | dml_insert | | | ✓ | | | | | | | | | | | |
| Data Update | dml_update | | | | ✓ | | | | | | | | | | |
| Data Delete | dml_delete | | | | | ✓ | | | | | | | | | |
| Structure Access | ddl_access | | | | | | | | | | ✓ | | | | |
| Structure Modify | ddl_modify | | | | | | | ✓ | ✓ | ✓ | | | | | |
| Structure Insert | ddl_insert | | | | | | | ✓ | | | | | | | |
| Structure Update | ddl_update | | | | | | | | ✓ | | | | | | |
| Structure Delete | ddl_delete | | | | | | | | | ✓ | | | | | |
| | acl_access 3 | | | | | | | | | | | | | | ✓ |
| Permission Modify | acl_modify | | | | | | | | | | | ✓ | ✓ | ✓ | |
| Permission Insert | acl_insert | | | | | | | | | | | ✓ | | | |
| Permission Update | acl_update | | | | | | | | | | | | ✓ | | |
| Permission Delete | acl_delete | | | | | | | | | | | | | ✓ | |
| Procedure Execute | proc_execute | | | | | | | | | | | | | | ✓ |

Depending upon implementations, database-wide impacts may be reported as ACL impacts or DDL impacts. FIG. 8 shows examples of database-wide DDL impacts of database statements, according to one embodiment of the composite impact reporting scheme. In FIG. 8, <name> is a placeholder for the actual name of the database established at login time. Note that, in FIG. 8, Asymmetric Keys are not an entity type to be tracked for statement impacts. Thus, no impact is reported on "<keyname>". Further, not all database-wide changes are security-related. For example, impacts on user defined types may not be reported if they are not a tracked entity. Thus, no impact is reported on a statement to drop a user defined type MyType from a database "<name>" (e.g., DROP TYPE MyType . . . (TSQL)). Similarly, impacts on rules/constraints may not be reported if they are not tracked. Thus, no impact is reported on a statement to drop a rule from a database "<name>" (e.g., DROP RULE MyRule . . . (TSQL)).

FIG. 9 shows an example of table index related impacts of database statements, according to one embodiment of the composite impact reporting scheme. Indexes are another type of "non-structural" table change that may be reported. In FIG. 9, a statement CREATE INDEX <index_name> ON <table> (<columns>) have a table impact and a column impact. In this example, the table impact is ranked as a DDL update on the table. DDL_UPDATE is considered less severe than DDL_INSERT, which means that an entire table is created. In this example, the column impact indicates a weak access, which shows the statement's "slight usage" of the column's contents in contrast with the stronger access of a SELECT statement. In this example, no impact is reported on "<index_name>" since indices are not an entity type that is tracked (e.g., via an ImpactTracker object).

Although the present invention has been described in detail herein with reference to the illustrative embodiments, it should be understood that the description is by way of example only and is not to be construed in a limiting sense. It is to be further understood, therefore, that numerous changes in the details of the embodiments of this invention and additional embodiments of this invention will be apparent to, and may be made by, persons of ordinary skill in the art having reference to this description. It is contemplated that all such changes and additional embodiments are within the scope of the invention as detailed in the following claims.

What is claimed is:

1. A database appliance comprising:
a processor; and
a memory means accessible by said processor and storing computer instructions executable by said processor to:
receive a database request from a database client coupled to said database appliance, wherein said database request from said database client is directed to a database server connected to said database appliance;
extract one or more database statements from said database request;
parse said one or mare database statements;
determine, at statement level, impact of said database request and database entities affected by said impact of said database request, wherein said one or more database statements have zero or more impacts at levels of a database hierarchy, including an entity level; and
for each of said database entities, generate an impact vector containing an entity name and a corresponding 32-bit impact bitmap with one or more bits set to 1, each representing an impact to said entity, wherein said impact vector comprises a first group of bits representing changes to actual database contents, a second group of bits representing changes in permissions granted to objects, and a third group of bits representing changes not covered by the first and second groups.

2. The database appliance of claim 1, wherein said one or more database statements are Structured Query Language (SQL) statements.

3. The database appliance of claim 1, wherein said computer instructions are further executable by said processor to generate a composite report on Data Manipulation Language (DML) impacts, Data Definition Language (DDL) impacts, and Access Control Language (ACL) impacts.

4. The database appliance of claim 3, wherein each of said group of DML, DDL, and ACL impacts comprises a data access bit (A), a data insert bit (I), a data update bit (U), and a data delete bit (D).

5. The database appliance of claim 3, wherein each of said group of DML, DDL, and ACL impacts comprises a weak data access bit (W), a strong data access bit (S), a data insert bit (I), a data update bit (U), and a data delete bit (D).

6. The database appliance of claim 3, wherein said impact vector further comprises at least one legacy bit (E) indicating execution of a stored procedure.

7. The database appliance of claim 1, wherein said computer instructions are further executable by said processor to aggregate individual impact vectors.

8. The database appliance of claim 1, wherein said computer instructions are further executable by said processor to translate said impact vectors into a format acceptable by a policy engine.

9. A non-transitory computer readable medium carrying computer instructions executable by a processor of a database appliance of:
receive a database request from a database client coupled to said database appliance, wherein said database request from said database client is directed to a database server connected to said database appliance;
extract one or more database statements from said database request;
parse said one or mare database statements;
determine, at statement level, impact of said database request and database entities affected by said impact of said database request, wherein said one or more database statements have zero or more impacts at levels of a database hierarchy, including an entity level; and
for each of said database entities, generate an impact vector containing an entity name and a corresponding 32-bit impact bitmap with one or more bits set to 1, each representing an impact to said entity, wherein said impact vector comprises a first group of bits representing changes to actual database contents, a second group of bits representing changes in permissions granted to objects, and a third group of bits representing changes not covered by the first and second groups.

10. The non-transitory computer readable medium of claim 9, wherein said computer instructions are further executable by said processor to generate a composite report on Data Manipulation Language (DML) impacts, Data Definition Language (DDL) impacts, and Access Control Language (ACL) impacts.

11. The non-transitory computer readable medium of claim 10, wherein each of said group of DML, DDL, and ACL impacts comprises a data access bit (A), a data insert bit (I), a data update bit (U), and a data delete bit (D).

12. The non-transitory computer readable medium of claim 11, wherein each of said group of DML, DDL, and ACL impacts comprises a weak data access bit (W), a strong data access bit (S), a data insert bit (I), a data update bit (U), and a data delete bit (D).

13. The non-transitory computer readable medium of claim 10, wherein said impact vector further comprises at least one legacy bit (E) indicating execution of a stored procedure.

14. The non-transitory computer readable medium of claim 9, wherein said computer instructions are further executable by said processor to aggregate individual impact vectors.

15. The non-transitory computer readable medium of claim 9, wherein said computer instructions are further executable by said processor to translate said impact vectors into a format acceptable by a policy engine.

16. A method of reporting impacts of database statements at a database appliance, comprising:
    receive a database request from a database client coupled to said database appliance, wherein said database request from said database client is directed to a database server connected to said database appliance;
    extract one or more database statements from said database request;
    parse said one or mare database statements;
    determine, at statement level, impact of said database request and database entities affected by said impact of said database request, wherein said one or more database statements have zero or more impacts at levels of a database hierarchy, including an entity level;
    for each of said database entities, generate an impact vector containing an entity name and a corresponding 32-bit impact bitmap with one or more bits set to 1, each representing an impact to said entity, wherein said impact vector comprises a first group of bits representing changes to actual database contents, a second group of bits representing changes in permissions granted to objects, and a third group of bits representing changes not covered by the first and second groups; and
    aggregating individual impact vectors into a composite impact report.

17. The method according to claim 16, further comprising translating said composite impact report into a format acceptable by a policy engine.

18. The method according to claim 16, wherein said impact vector comprises impact bits for execution of stored procedures and database actions including entity-level access, insertion, update, and delete.

* * * * *